United States Patent
Ziari et al.

(10) Patent No.: US 8,606,120 B2
(45) Date of Patent: Dec. 10, 2013

(54) CONTROL OF AN INTERFEROMETRIC OPTICAL POLARIZATION BEAM SPLITTER

(75) Inventors: Mehrdad Ziari, Pleasanton, CA (US); Masaki Kato, Palo Alto, CA (US); Radhakrishnan L. Nagarajan, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 362 days.

(21) Appl. No.: 12/790,778

(22) Filed: May 28, 2010

(65) Prior Publication Data

US 2011/0293280 A1   Dec. 1, 2011

(51) Int. Cl.
*H04B 10/67* (2013.01)

(52) U.S. Cl.
USPC .............................. 398/213; 398/209; 398/65

(58) Field of Classification Search
USPC ........................................... 398/65, 209.213
See application file for complete search history.

(56) References Cited

U.S. PATENT DOCUMENTS

| 3,971,930 A * | 7/1976 | Fitzmaurice et al. | 398/213 |
| 5,659,560 A * | 8/1997 | Ouchi et al. | 372/27 |
| 2010/0150555 A1* | 6/2010 | Wang et al. | 398/65 |

* cited by examiner

*Primary Examiner* — Leslie Pascal
(74) *Attorney, Agent, or Firm* — Ross M. Carothers; David L. Soltz

(57) ABSTRACT

The present invention provides a system, apparatus and method to control an optical polarization beam splitter. A portion of an optical output of the polarization beam splitter is converted into a corresponding electrical signal. The electrical signal is then provided to the polarization beam splitter as a control signal via a feedback loop. The polarization beam splitter controls a characteristic of the optical output of the polarization beam splitter in response to the received control signal. The characteristic, for example, may be controlled through thermo-optically or electro-optically. The control system may be used over a period of time to maintain the characteristic at a desired value, for example as the components of the polarization beam splitter, or other elements used in the control of the polarization beam splitter, age.

24 Claims, 8 Drawing Sheets

CONTROL OF AN INTERFEROMETRIC OPTICAL POLARIZATION BEAM SPLITTER

BACKGROUND OF THE INVENTION

1. Field of the Invention

This invention relates generally to optical telecommunication systems and, more particularly, to receivers employed in such systems.

2. Description of the Related Art

Polarization diverse optical circuits use a polarization beam splitter (PBS) to split an incoming optical signal into two orthogonal and spatially separated polarization states. These output polarization states are often the transverse electric (TE) and transverse magnetic (TM) polarization states of a planar optical waveguide circuit.

A PBS in planar lightwave circuits (PLCs) may be formed from a birefringent interferometric structure, such as the birefringent Mach-Zehnder PBS described in U.S. Pat. Nos. 7,035,491 and 7,356,206, both of which are incorporated herein by reference in their entirety. As depicted in FIG. 1, the basic configuration of an interferometric PBS includes an input coupler 114 having an input and two outputs and an output coupler 120 having two inputs and two outputs, and a pair of birefringent interferometric arms 116, 118 between the input and output couplers. The first arm 116 may couple the first output port of the input coupler 114 to the first input port of the output coupler 120, and the second arm 118 may couple the second output port of the input coupler 114 to the second input port of the output coupler 120. As depicted, the first arm 116 has a length L1 which differs from a length L2 of a second arm 118. The arms 116, 118 are "birefringent" with respect to each other such that the differential phase accumulation of two orthogonal polarization states propagating in the arms 116, 118 is correspondingly different. The differential phase accumulation, is typically the difference in phase between light having TE and TM polarizations propagating over length L1 in arm 116 and over length L2 in arm 118.

In operation, an optical signal may be provided as an input 112A to the input coupler 114. The coupler 114 splits the optical signal into a first optical signal which propagates on arm 116 and a second optical signal which propagates on arm 118, the first and second optical signals being of substantially the same optical power. In Mach-Zehnder interferometers, the amount of power exiting each of the first and second output ports of the output coupler 120, labeled "Output 1" and "Output 2" for example, may depend on the relative, or differential, phase between each of the two optical signals propagating in the arms 116, 118 at the corresponding input ports of the output coupler 120. In the special case that the differential phase is observed to be in multiples of 0°, for example 0°, 360°, etc., or mathematically 0°+N*360°, for any integer number N equal to or greater than 0, all the optical power will be directed out the first of the two output ports of the output coupler 120, and none out the second port. In the special case that the differential phase is observed to be in multiples of 180°, for example 180°, 540°, etc., or mathematically 180°+N*360°, for any integer number N equal to or greater than 0, all the optical power will be directed out the second port, and none out the first port.

The birefringent Mach-Zehnder PBS is typically designed such that for one polarization, the differential phase between first and second optical signals propagating through arm 116 and arm 118, respectively, is a multiple of 0°, while for the other orthogonal polarization the differential phase is a multiple of 180°. As a result, the optical signal associated with the first polarization will exit entirely at the first of the two output ports, Output 1 for example, of the output coupler 120, as an output signal 122A for example, while the optical signal associated with the other orthogonal polarization will exit entirely at the second of the two output ports, Output 2 for example, of the output coupler 120, as an output signal 122B for example.

Fabrication deviations and/or material ageing effects may impact the performance of the PBS over time, for example, resulting in the birefringent interferometric arms 116, 118 having differential phase lengths differing from the ideal lengths corresponding to relative phase multiples of 0° and 180°, as discussed above. With this degradation of the PBS performance, the two outputs of the output coupler 120 no longer include a single polarization state. Rather, a component of each polarization is present in the output signals 122A, 122B of the output coupler 120. Deviations away from the ideal design can be compensated by tuning one or both of the interferometric arms 116, 118, as discussed in commonly owned U.S. Pat. Nos. 7,035,491 and 7,356,206, both incorporated herein by reference in their entirety.

A thermo-optic effect is an often used tuning mechanism in optical devices. For instance, thermal energy in the form of heat may be applied to one of the interferometric arms 116, 118 to change the phase relationship of the propagating optical signals. This approach can be used to tune the phase of each of the optical signals propagating in the arms 116, 118 so that they are closer to the design criteria, e.g. multiples of 0° and 180° for the two polarizations, respectively, as described above. An electro-optic effect, for example where an electrical current or voltage changes the optical material index, may similarly be used for tuning Often, however, characteristics of the PBS may change over time, due to fabrication defects, device ageing or environmental conditions such as temperature or humidity for example, leading to performance degradation in the PBS.

What is needed is a PBS which can be tuned over a period of time commensurate with the use of the PBS to compensate for fabrication defects, device aging, or environmental operating conditions, which may lead to a corresponding performance degradation of the PBS.

SUMMARY OF THE INVENTION

The present invention provides a system, apparatus and method to control an optical polarization beam splitter. According to various embodiments of the invention, a circuit is provided which includes a polarization beam splitter, an optical detector and a control system. The polarization beam splitter may include an input and first and second outputs, and may be configured to receive an optical signal at the input and provide a first optical output signal at the first output and a second optical output signal at the second output. The optical detector includes an input and an output, and is configured to accept a portion of the first optical output signal on the input and convert the optical signal into an electrical signal provided on the output. The control system is configured to receive the electrical signal from the optical detector on an input and generate a control signal provided on an output of the control system. The polarization beam splitter is configured to receive the control system and control a characteristic of the first optical output signal in response to the received control signal. In certain aspects of the invention the characteristic is a polarization mode, for example the characteristic may be a TM mode or a TE mode. In other aspects of the invention the portion of the first optical output signal detected by the optical detector includes a portion of a wavelength division multiplexed signal, or a portion of an amplified spontaneous emission. In still other aspects of the invention the polarization beam splitter includes a heater, the heater modifying a temperature of the polarization beam splitter in respond to the received control signal. In other aspects of the invention the circuit further comprises an optical decombiner having an input and a plurality of outputs, the optical combiner may be configured to accept the first optical output signal and decombine the first optical output signal into a plurality of first optical signals, each provided on a corresponding one of the plurality of outputs, the portion of the first optical output signal received by the optical detector being a portion of one of the plurality of first optical signals. According to certain aspects of the invention the optical decombiner may be an arrayed waveguide grating. According to still other aspects of the invention the polarization beam splitter may be operated as a polarizer, only one of the first and second outputs being utilized for example.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

The present invention provides a system, apparatus and method to control an optical polarization beam splitter. A portion of an optical output of the polarization beam splitter is converted into a corresponding electrical signal. The electrical signal is then provided to the polarization beam splitter as a control signal via a feedback loop. The polarization beam splitter controls a characteristic of the optical output of the polarization beam splitter in response to the received control signal. The characteristic, for example, may be controlled thermo-optically or electro-optically. The control system may be used over a period of time to maintain the characteristic at a desired value, for example as the components of the polarization beam splitter, or other elements used in the control of the polarization beam splitter, age.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, signals, whether optical or electrical, between these components may be modified, re-formatted or otherwise changed by intermediary components.

Reference will now be made in detail to the present exemplary embodiments, which are illustrated in the accompanying drawings.

The performance of an interferometric PBS may change or degrade over time due to aging of one or more of the various elements which form the PLC chip. The PBS performance may also change over time as a result of changes in operating conditions, or changes in the operating environment, such as temperature for example. Any such changes can impact system performance and, thus, should be mitigated. The present invention may be utilized to tune or trim the performance of the PBS while the PBS, and its corresponding optical circuit, are operational in the field. The present invention may also be used to optimize the PBS performance during initial calibration and at system startup.

Figure 1:
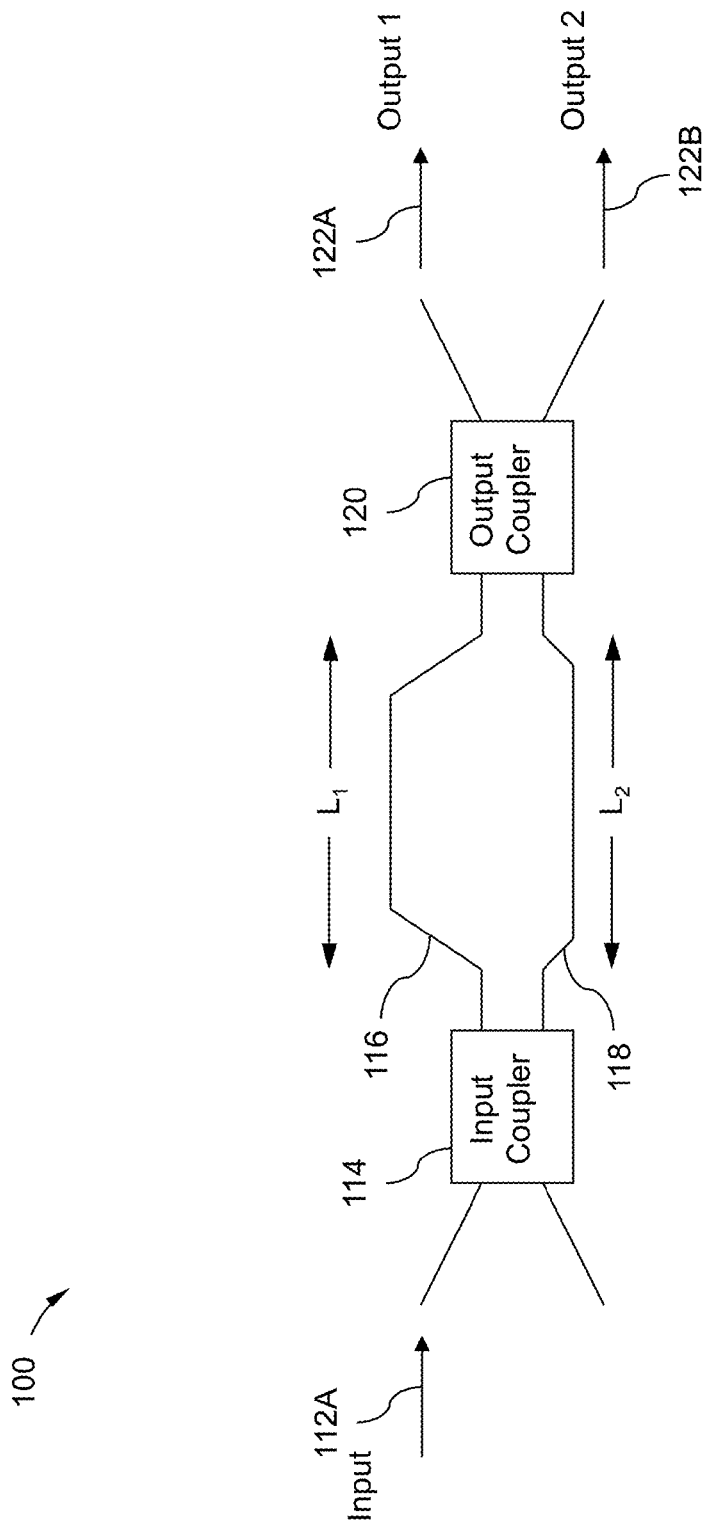
FIG. 1 is a block diagram of a polarization beam splitter.
Figure 2:
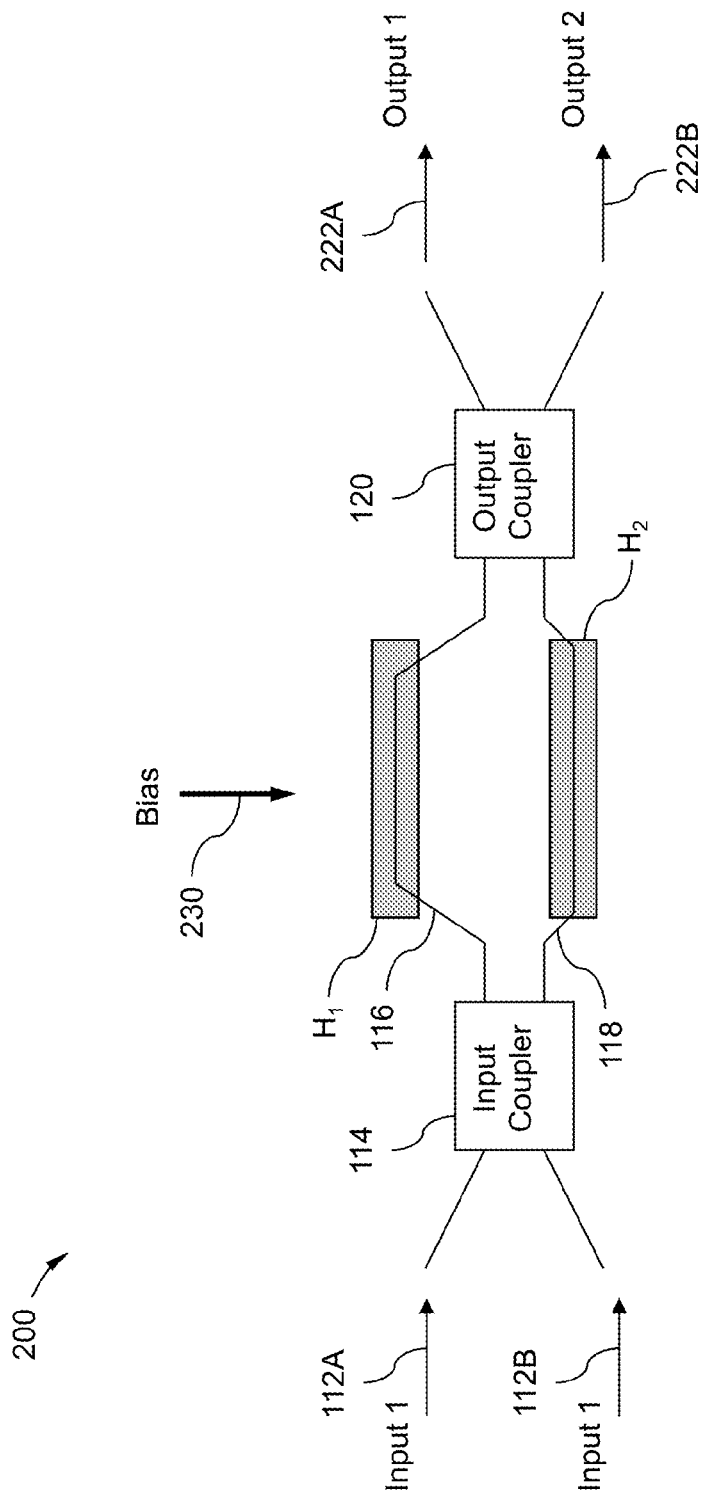
FIG. 2 is a block diagram of a polarization beam splitter, consistent with various aspects of the present disclosure.

Turning to FIG. 2, a block diagram of an exemplary PBS utilized in conjunction with the present invention will be discussed in greater detail. PBS 200 is similar to the PBS 100 of FIG. 1, however PBS 200 includes one or more heaters $H_1$, $H_2$. For example, a first heather $H_1$ may be positioned adjacent to arm 116 such that activation of the heater acts to heat a portion of the arm 116 and modify the phase relationship of a first optical signal propagating arm 116 and a second optical signal propagating arm 118. If desired, another heater $H_2$ may be positioned along the arm 118 such that activation of the heater $H_2$ acts to heat a portion of the arm 118 to modify the phase relationship between the first and second optical signals propagating arms 116 and 118, respectively. Also present in PBS 200 of FIG. 2 is a thermo-optic or an electro-optic input signal 230 to adjust, or otherwise bias, the performance of the PBS. Therefore, for example, the bias input signal 230 may be an electrical voltage or current which is applied to one or more of the heaters $H_1$, $H_2$ to adjust the performance of the PBS, as previously described. Alternatively, the PBS may be fabricated from electro-optic material, the performance changed by electro-optic mechanisms, the bias being a voltage or current which changes the optical material index, of arms 116, 118 for example.

The PBS 200 of FIG. 2 is but one exemplary PBS of many which may be used in conjunction with the present invention. The present invention pertains to all classes of PBSs whose performance may be changed through the use of thermo-optic or electro-optic mechanisms, regardless of whether the PBS is interferometric or not. Other exemplary PBS devices include, for example, those disclosed in U.S. Pat. Nos. 5,946,434; 5,475,771; 5,293,436; 5,151,957; 5,133,029; 5,111,517; 5,056,883; and 4,772,084.

Figure 3A:
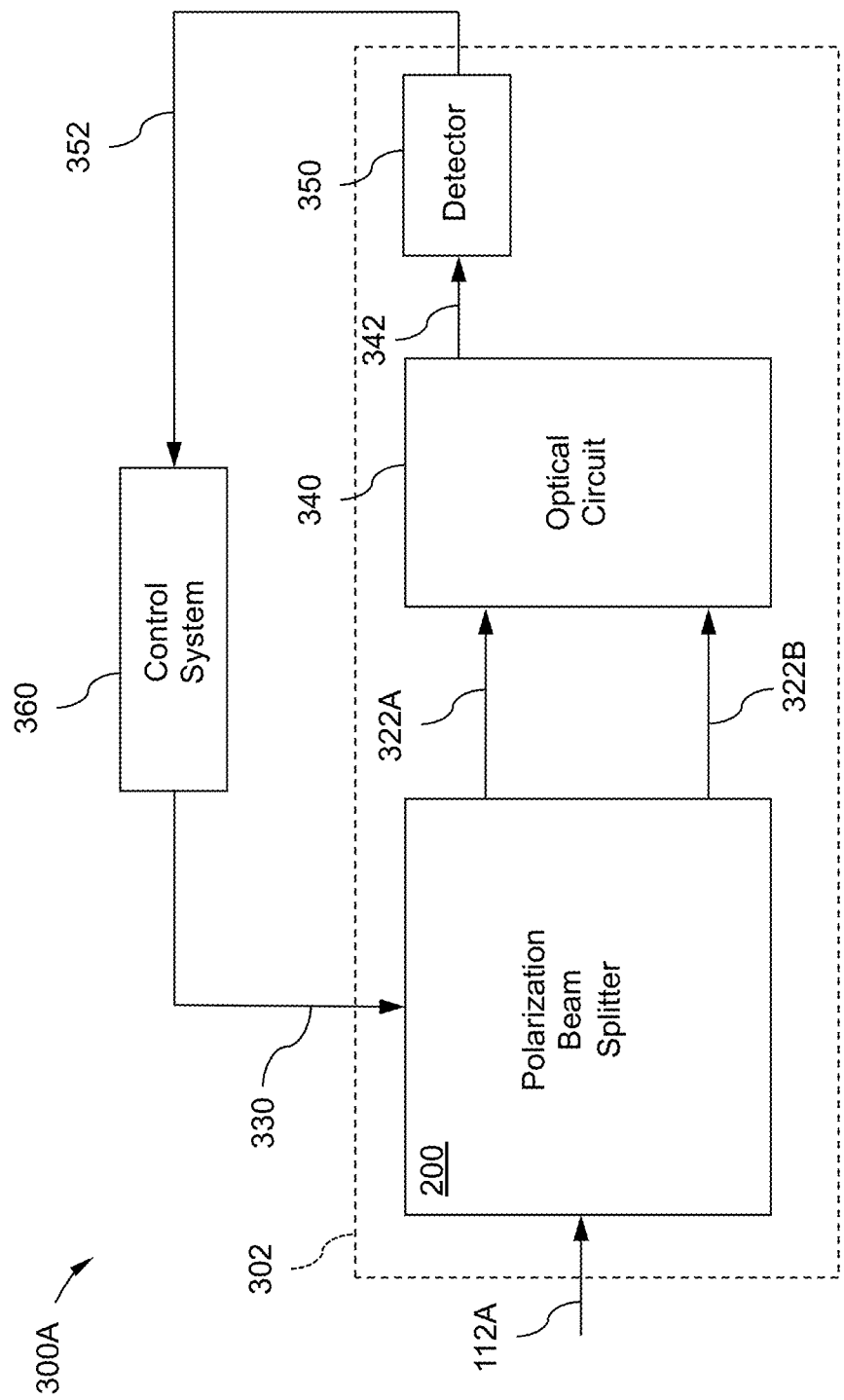
FIG. 3A is a block diagram of a first circuit, consistent with various aspects of the present disclosure.

Turning to FIG. 3A a first exemplary embodiment of the present invention, system 300A, may include the PBS 200, an optional optical circuit 340, an optical detector 350, and a control system 360. The PBS 200 is configured to accept an input optical signal 112A and split the optical signal 112A into two portions, a first portion 322A provided at a first output of the PBS 200 and a second portion 322B provided at a second output of the PBS 200. The first portion 322A of the optical signal 112A provided to a first input of the optical circuit 340 and the second portion 322B of the optical signal 112A provided to a second input of the optical circuit 340. The optical circuit 340 provides optical signal 342 including a portion of light from either the first or second portion 322A, 322B to the optical detector 350. The optical signal 342 is converted from the optical domain into the electrical domain by the optical detector 350, the electrical signal 352 corresponding to the optical signal 342. The electrical signal 352 is provided to the control system 360 which processes the signal 352 to generate a bias signal 330 which is then provided to the PBS 200 to control a characteristic of the PBS 200 which, in turn, controls a characteristic of the optical signals propagating through the PBS 200, as discussed in greater detail above. As shown, the PBS 200, the optical circuit 340, and the optical detector 350 may be provided on a substrate 302, shown in dashed-line, as part of a PLC chip for example. In this case, the electrical signal 352 may be communicated from the substrate, via one or more electrical contacts (not shown) in electrical communication with the detector 350 for example, to the control system 360 through electrical wiring. Similarly, the bias signal 330 may be provided to the PBS via one or more electrical contacts (not shown). Although depicted as originating from the optical circuit 340, the optical signal 342 could be taken directly from signals 322A or 322B, through an optical tap for example as is well known in the art.

While shown as a distinct element with respect to the optical circuit 340, the PBS 200 may be contained within, or otherwise be part of, the optical circuit 340. Additionally, there may be one or more additional optical circuits (not shown), each of which may be functionally positioned before the PBS 200 or functionally positioned after the PBS 200. While each of the PBS 200, the optical circuit 340 and the optical detector 350 are discussed with respect to being provided on a single substrate 302, each may also be individually provided on separate substrates, the elements 200, 340, 350 being butt-coupled or fiber-coupled to provide the optical interconnections therebetween for example. The control system 360 may also be provided on the same substrate 302 as the PBS 200, the optical circuit 340 and the optical detector 350.

The optical signal 342, from which electrical signal 352 is based, may originate external to system 300A or internal to system 300A. For example, the electrical signal 352 may contain a portion of the input signal 112A received by the PBS 200, such as an WDM signal including a number of optical signals. The optical signal 342 may include a portion of one or more of the optical signals of the WDM signal provided to the input 112A, the one or more optical signals used to transport optical data traffic at a respective one or a number of wavelengths over a network infrastructure. Alternatively, the optical signal 342 may include a portion of one or more of the WDM signals which are not used to transport data traffic over a network infrastructure, the wavelengths of such WDM signals may sometimes be referred to as alien wavelengths, which may be generated external to the system 300A or internal to the system 300A. Optical signals carried by such alien wavelengths may be used also for diagnostic purposes, for example, in addition to optimization of the PBS 200. The polarization state or mode of the optical signal, or a portion thereof, at an alien wavelength may be purposely adjusted to aid in the optimization of the PBS 200. For example, the polarization state of an optical signal, as part of optical signal 122A for example, having an alien wavelength may be modified or rotated over time such that there is always an optical signal which is averaged over time at any one of the two output ports of the PBS 200. Thus, in a time averaged sense, neither one of the two output signals, optical signals 322A, 322B for example, will have zero power at that alien wavelength signal. Alternatively, the power, phase, or wavelength of an optical signal, as part of the input signal 112A for example, may be dithered in some fashion such that the control system 360 may be configured to interpret the dithering of an electrical signal, electrical signal 352 for example, corresponding to the dithered optical signal, and optimizing the PBS 200 performance accordingly.

While the input signal 112A is described as being provided on a first input port of the PBS 200, along with other optical signals as part of a WDM signal for example, the input signal 112A may be provided on a first of the two input ports of the PBS 200 while optical signals associated with transport of data traffic may be provided on a second of the two input ports of the PBS 200. For example, implementations of a PBS consistent with this disclosure may use an input splitter having two inputs and two outputs, such as the input couplers of FIGS. 1 and 2. A first primary input may be used to provide optical signals associated with transport of data traffic to the PBS, such as PBS 200, and a second input port may be used to provide optical signals associated with PBS optimization, consistent with this disclosure.

The optical signal 342 may include optical energy not associated with any specific wavelength, whether or not used for transport of optical data traffic, such as amplified spontaneous emission (ASE). The ASE may be generated internal to the system 300A, for example through the operation of a semiconductor optical amplifier (SOA) as part of system 300A, or other similar structure. A portion of the output of the SOA may then be provided to the detector 350 as optical signal 342.

Figure 3B:
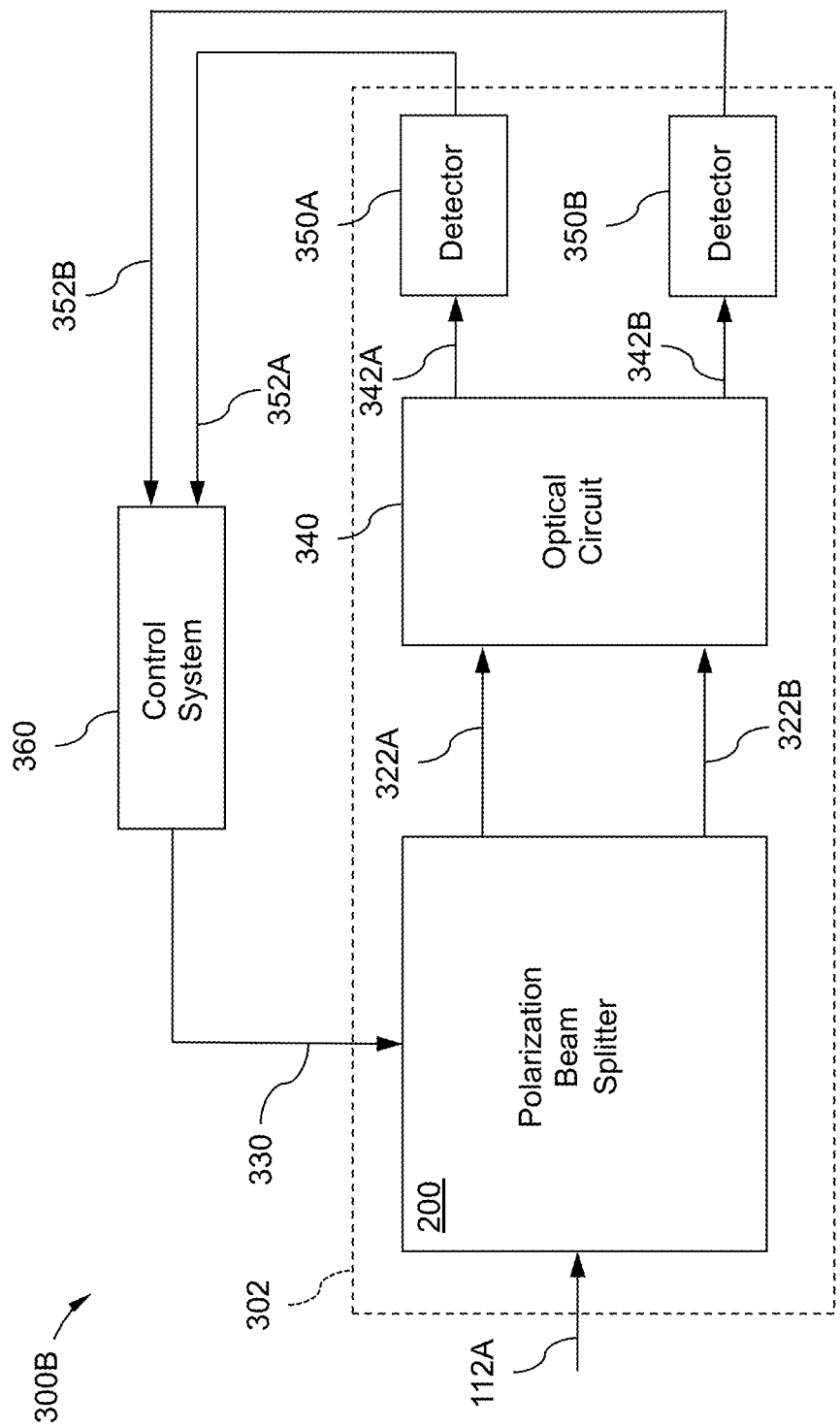
FIG. 3B is a block diagram of a second circuit, consistent with various aspects of the present disclosure.

Turning to FIG. 3B, a second exemplary embodiment, system 300B, is similar to system 300A, however the optical circuit 340 is configured to provide two optical output signals 342A, 342B, each provided to a separate optical detector 350A, 350B. Each respective optical detector 350A, 350B, as discussed above with respect to detector 350 of system 300A, acts to convert the received optical signal 342A, 342B into the electrical domain, supplying corresponding electrical signals 352A, 352B to the control system 360. As stated above, the electrical system 360 may receive the electrical signals through any suitable mechanisms, for example via wiring electrically coupled to the detectors 350A, 350B. The control system 360 may process one or both of the electrical signals 352A, 352B to generate the bias signal 330.

Figure 4:
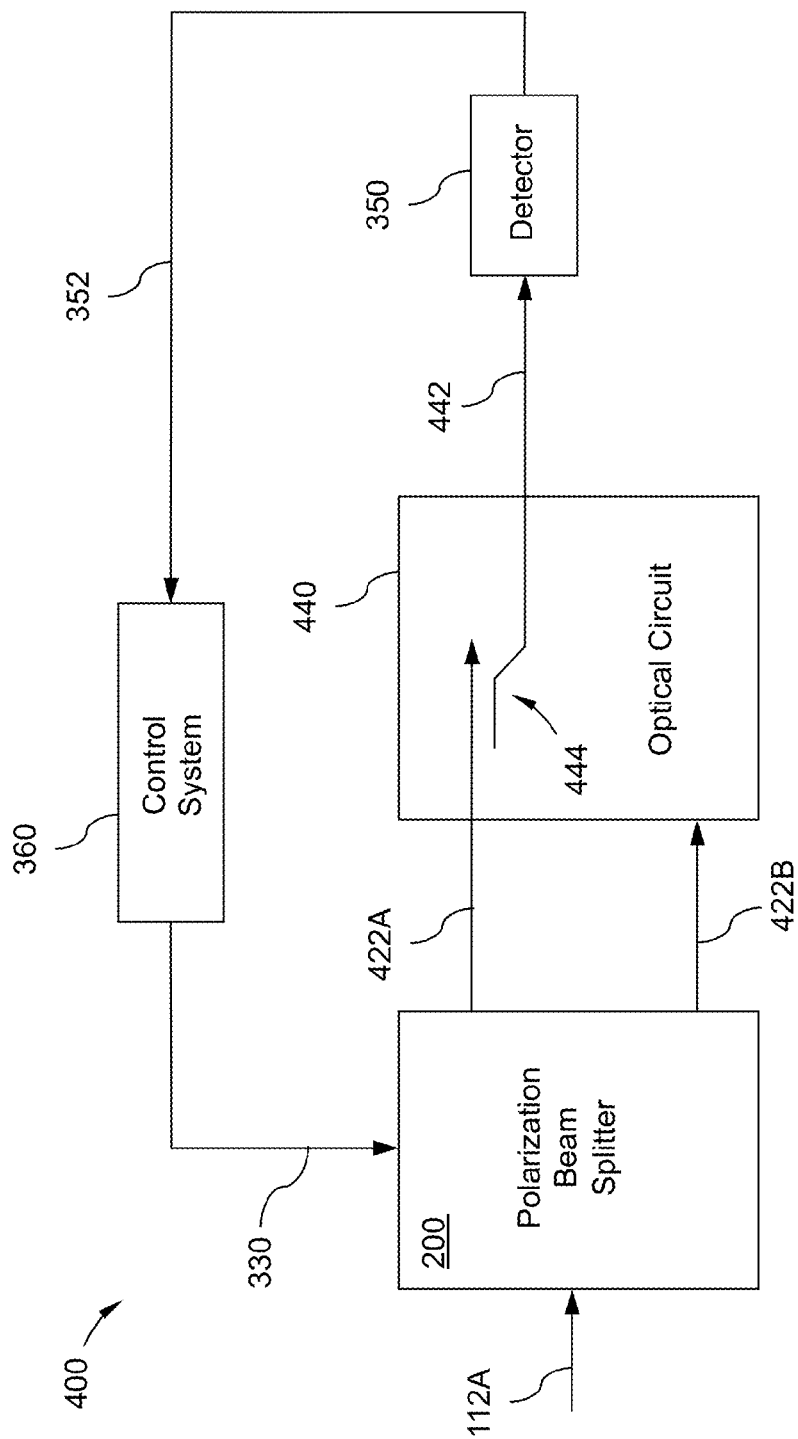
FIG. 4 is a block diagram of a third circuit, consistent with various aspects of the present disclosure.

Turning to FIG. 4, a system 400 is depicted which is similar to system 300A, however includes an optical circuit 440 in place of optical circuit 340. As shown, input signal 112A is provided to PBS 200 and split to form first and second optical signals 422A, 422B, for example in similar fashion as discussed above. Optical circuit 440 may include an optical tap 444 which may be used to obtain a portion, e.g. optical signal 442, of the optical signal 422A, the remainder of the optical signal 422A provided to other portions of circuit 440, or of system 400, for further processing for example. The optical signal 442 is provided on an output port of the optical circuit 440 and subsequently provided to the detector 350. The optical tap 444 may be any suitable coupler including, but not limited to, a directional coupler, a Y-splitter or coupler or other multi-branch coupler, or a multimode interference (MMI) device. Additionally, optical tap 444 may operate over a wide bandwidth, e.g. broadband, such that the tap 444 has little wavelength selectivity. Alternatively, the tap 444 may be a wavelength selective tap such as a wavelength filter and only obtain or tap off optical signals propagating as part of optical signal 422A which have specific wavelengths, or are within a desired bandwidth. For example, a wavelength selective tap may extract a portion of an alien wavelength, described above, without disturbing other wavelengths which are being used to transport data traffic over a network infrastructure.

Figure 5:
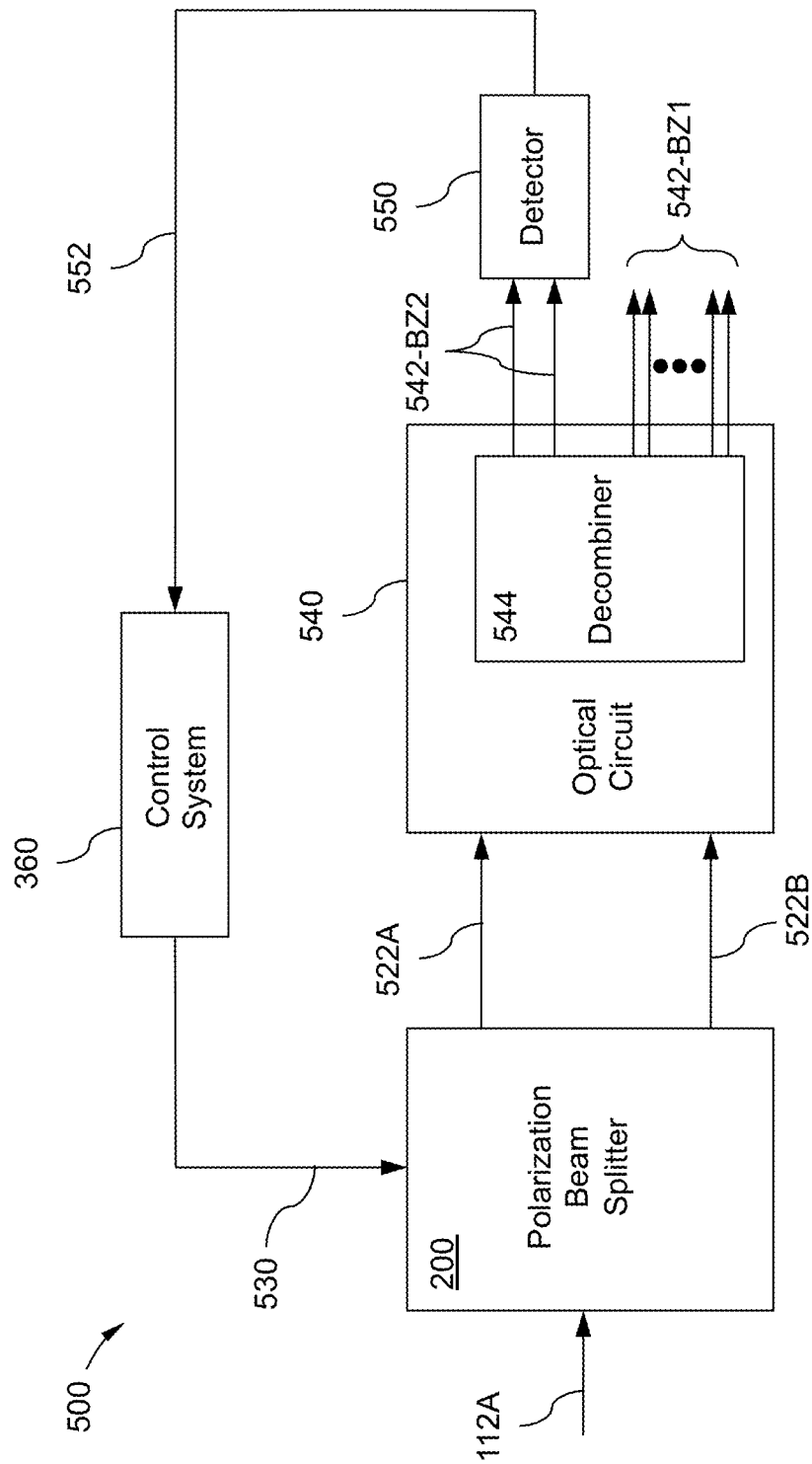
FIG. 5 is a block diagram of a fourth circuit, consistent with various aspects of the present disclosure.

Turning to FIG. 5, a block diagram of another exemplary system 500, similar to system 300A, is shown. System 500, however, includes an optical circuit 540 in place of circuit 340 and optical detector 550 in place of detector 350. Input signal 112A enters PBS 200 and is split to form a first optical signal 522A and a second optical signal 522B, each provided to the optical circuit 540. The optical circuit 540 includes a decombiner 544, such as an arrayed waveguide grating (AWG) or an Echelle grating for example. The decombiner 544 may accept one or more WDM signals and decombine them into a number of optical signals for further processing. Wavelength demultiplexers or decombiners, such as an AWG 544, exhibit Brillouin zones, for example zones which are spatially separated but low power replicated images of the primary output ports of the demultiplexer. Decombiner 544 has a first set of outputs, e.g. primary outputs 542-BZ1, provided at a first Brillouin zone along an output portion of the decombiner 544. Decombiner 544 includes a second set of outputs, e.g. secondary outputs 542-BZ2, provided at a second Brillouin zone along the output portion of the decombiner 544. Thus, power in higher-order Brillouin zones, corresponding to 542-BZ2 for example, which would otherwise be unused or wasted, can provide a source for optical signals 542-BZ2 to be processed by an optical detector 550. Since the output ports of higher-order Brillouin zones carry true replicas of the actual WDM signals corresponding to the primary Brillouin zone, however at a lower optical power, the control system 360 can be used to optimize of the system 500 with respect to WDM performance. The optical detector 550 may obtain optical signal power from one or more ports associated with a single Brillion zone, as shown, or multiple Brillion zones, a first group of ports associated with a first Brillion zone and a second group of ports associated with a second Brillion zone for example. In any case, the detector 550 converts the received one or more optical signals 542-BZ2 into the electrical domain and provides an electrical signal 552 to the control system 360, as described herein with respect to system 300A of FIG. 3 for example. Control system 360 then processes the signal to generate a bias signal 530 which is then provided to PBS 200 for optimization, as described above.

Figure 6:
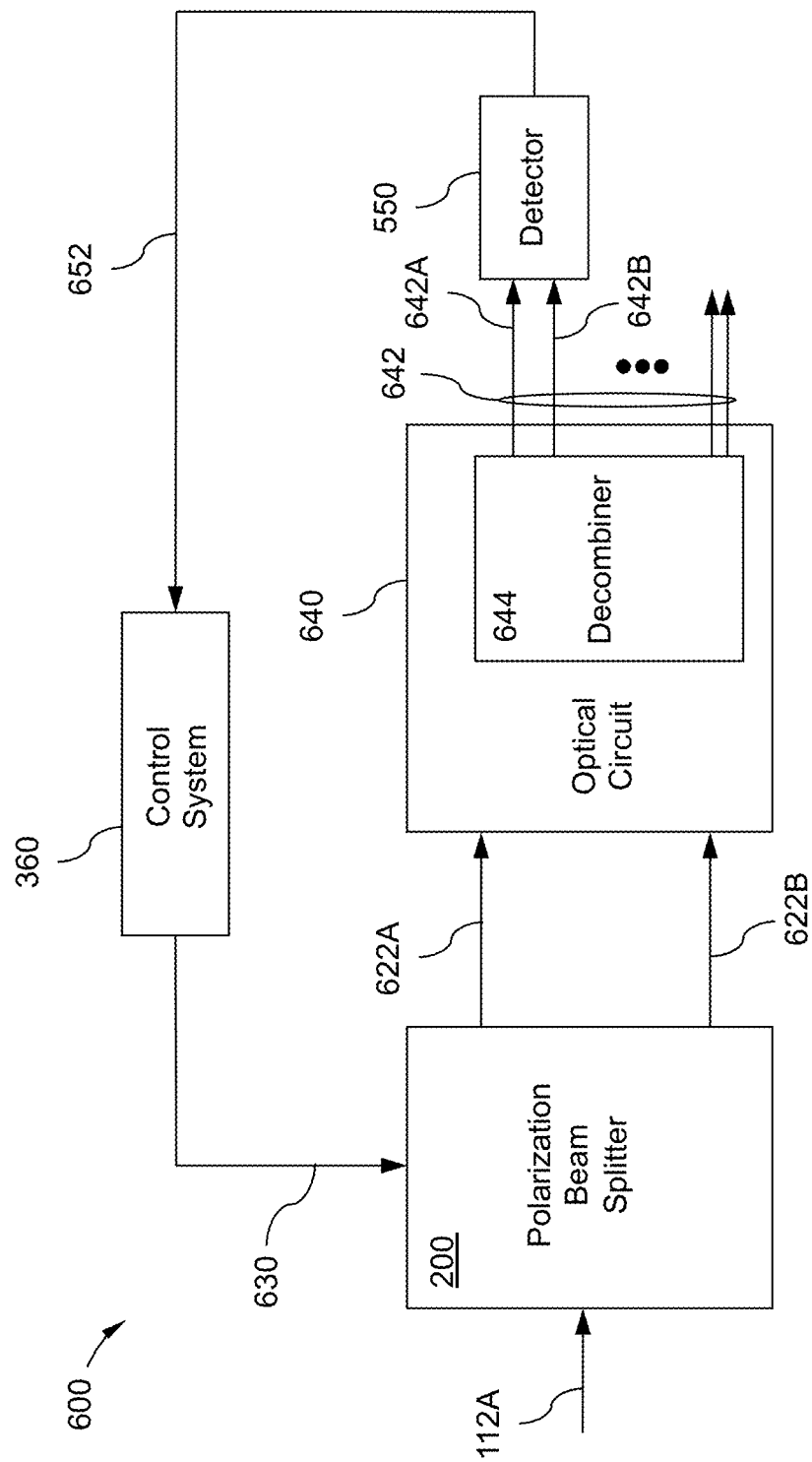
FIG. 6 is a block diagram of a fifth circuit, consistent with various aspects of the present disclosure.

Turing to FIG. 6, yet another exemplary system 600 will be discussed in greater detail. Input signal 112A is provided to PBS 200 which splits the signal into first and second portions 622A, 622B which are then provided to an optical circuit 640. System 600 includes a decombiner 644 similar to the decombiner 544 of FIG. 5. However, one or more optical signals 642 provided from the primary output Brillouin zone of the decombiner 644 are provided to the optical detector 550. Optical detector 550 then converts the one or more optical signals 642 received into one or more corresponding electrical signals 652 (only one shown) which are then provided to control system 360, as described above. The control system 360 processes the signals 652 to generate the bias signal 630 which is then provided back to the PBS 200 to optimize or modify a characteristic of the PBS 200 which, in turn, modifies a characteristic of the one or more optical signals propagating through the PBS 200. The wavelengths of the one or more optical signals 642 provided to the optical detector 550 may be Alien wavelengths, e.g. wavelengths outside of the operating bandwidth utilized for to transport data traffic. As discussed with respect to system 500 of FIG. 5, the one or more optical signals 642 may originate from one or more ports, as part of the primary output, e.g. the primary Brillouin zone.

While a first optical signal 642A and a second optical signal 642B is shown being provided to optical detector 550, it may be advantageous to separately detect each of the first and second optical signals 642A, 642B. For example, the first optical signals 642A may be obtained from the optical signal 622A while the second optical signal 642B may be obtained from the optical signals 622B. In this case, as discussed above with respect to the system 300B of FIG. 4, two detectors may be used to obtain each of the first and second optical signals 642A, 642B, respectively, and convert the signals to corresponding electrical signals to be provided to the control system 360 for further processing. In this example, since the two optical signals 642A, 642B originate from orthogonally polarized outputs 622A, 622B, respectively, the additional information collected may be of use to better optimize the performance of the PBS 200. For example, in the special case where the input polarization of the input signal 112A is aligned perfectly to the polarization state of one of the output ports of the PBS 200, then substantially all of the power will be present on a first of the two optical signals 622A, 622B and substantially no optical power will be present on a second of the two optical signals 622A, 622B. If the detector 550 is configured to only obtain an optical signal from the second of the two optical signals 622A, 622B then no power, e.g. no signal, will be present with to process in the optimization of the PBS 200. With two detectors obtaining the signals 642A, 642B from complimentary ports guarantees that there is always some signal with which the control system 360 can process to optimize the PBS 200.

Figure 7:
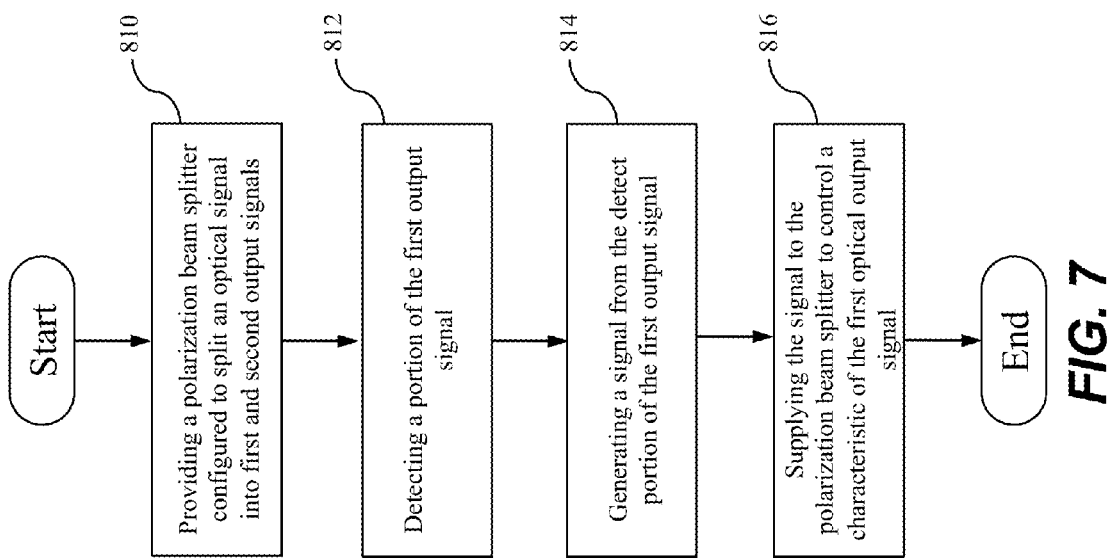
FIG. 7 is a block diagram of a method for processing a signal, independent of structure, consistent with various aspects of the present disclosure.

Turning to FIG. 7, an exemplary method for controlling a characteristic of an optical signal propagating through a PBS, such as a PBS 200, is provided. A PBS is provided in a first step 710, the PBS configured to split an optical signal, received at an input of the PBS for example, into first and second outputs output signals. The output signals may each carry about half the power of the received optical signal input. Alternatively, each of the first and second output signals may carry substantially different powers. A portion of the first output signal is detected in a step 712. As discussed above, the detected portion can be obtained through any suitable means. For example, through the use of an optical tap or coupler, or via another optical element such as an optical combiner. With respect to the optical combiner, the detected portion can be obtained via a higher order Brillouin zone output, on an alien wavelength for example as discussed above. The detected portion of the first output signal is processed to generate a signal, a control signal or a correction signal for example, in a step 714. The signal is then supplied to the PBS to control a characteristic of the first optical output signal in a step 716, the characteristic for example being a phase of the first optical output signal. The signal generated in step 714 may initially be used to modify a characteristic of the PBS itself, which then may lead to a corresponding change in a characteristic in the first optical output signal. For example, the signal generated in step 714 may initially be used to modify a temperature of a portion of the PBS, the temperature resulting in a modification of the a characteristic of the first optical output signal. Alternatively, the signal generated in step 714 may initially be used to modify an index of a material, as part of the PBS, such that a corresponding modification in a characteristic of the first optical output signal occurs. While the method is described in terms of the first output signal, the method 700 can equally be applied to the second output signal, as well. Moreover, while the steps of detecting 712 and generating 714 are described with respect to the first optical output signal, the step of supplying the generated signal to the PBS in step 716 may be performed with respect to the second optical output signal. Thus, modification of a characteristic of the second optical signal may be achieved through generating a signal from the detected portion of the first optical output signal. Additionally, it should be noted that the method 700 may be performed on each of the first and second optical output signals, simultaneously. Thus, portions of the first and second optical output signals are detected in step 712, and the signal is generated based upon the portions of first and second optical output signals in step 714. The signal would then be applied to the PBS to control a characteristic of either, or both, of the first and second optical output signals, as discussed herein.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method, comprising:
   receiving a first optical output signal at an input of a polarization beam splitter, the polarization beam splitter having first and second outputs; supplying a first optical output signal from the first output;
   supplying a second optical output signal from the second output; detecting a portion of the first optical output signal;
   generating a control signal in response to the detected portion of the first output optical signal; and
   supplying the control signal to a circuit to control a characteristic of the first optical output signal,
   wherein the signal supplied to the polarization beam splitter is a bias signal,
   wherein the bias signal supplied to the polarization beam splitter results in a thermo-optic effect which controls the characteristic of the first optical output signal.

2. The method of claim 1, further comprising the step of providing an optical detector, the optical detector configured to detect the portion of the first optical output signal.

3. The method of claim 2, wherein the optical detector is a photodetector.

4. The method of claim 1, wherein the characteristic is a phase.

5. The method of claim 1, wherein the characteristic is a polarization mode.

6. The method of claim 5, wherein the PBS supplies the first optical signal with a TM polarization in response to the control signal.

7. The method of claim 5, wherein the PBS supplies the first optical signal with a TE polarization in response to the control signal.

8. The method of claim 1, wherein the portion of the first optical output signal includes a portion of a wavelength division multiplexed signal.

9. The method of claim 1, wherein the portion of the first optical output signal includes a portion of an optical signal having an alien wavelength.

10. The method of claim 1, wherein the portion of the first optical output signal includes a portion of an amplified spontaneous emission.

11. A circuit, comprising:
    a polarization beam splitter having an input and first and second outputs, the polarization beam splitter configured to receive an optical signal on the input and provide a first optical output signal on the first output and a second optical output signal on the second output;
    an optical detector having an input and an output, the optical detector configured to accept a portion of the first optical signal on the input and convert the portion into an electrical signal provided on the output;
    a control system having an input and an output, the control system configured to receive the electrical signal on the input and generate a control signal provided on the output; and
    a heater which is configured to received the control signal and change a temperature of a portion of the polarization beam splitter in response to the received control signal,
    wherein the control signal from the control system is utilized to control a characteristic of the first optical output signal.

12. The circuit of claim 11, wherein the optical detector is a photodetector.

13. The circuit of claim 11, wherein the characteristic is a polarization mode.

14. The circuit of claim 11, wherein the polarization mode of the first optical output signal is an TM polarization mode.

15. The circuit of claim 11, wherein the polarization mode of the first optical output signal is an TE polarization mode.

16. The circuit of claim 11, wherein the portion of the first optical output signal includes a portion of a wavelength division multiplexed signal.

17. The circuit of claim 11, wherein a signal supplied to the polarization beam splitter is a bias signal.

18. The circuit of claim 11, further comprising an optical decombiner an input and a plurality of outputs, the optical combiner configured to receive the first optical output signal and decombine the first optical output signal into a plurality of first optical signals, each provided on a corresponding one of the plurality of outputs, the portion of the first optical output signal received by the optical detector being a portion of one of the plurality of first optical signals.

19. The circuit of claim 18, wherein the optical decombiner is an arrayed waveguide grating.

20. The circuit of claim 11, further comprising an optical decombiner having an input and first and second pluralities of outputs, the first plurality of outputs being along a first Brillion zone of the optical combiner, and the second plurality of outputs being along a second Brillion zone of the optical combiner, the portion of the first optical output signal received by the optical detector being a portion of one of the second pluralities of outputs of the optical decombiner.

21. The circuit of claim 11, wherein the optical detector is a first optical detector and the electrical signal provided on the output of the optical detector is a first electrical signal, and the input of the control system is a first input, the circuit further including a second optical detector having an input and an output, the second optical detector configured to accept a portion of the second optical signal on the input and convert the portion into a second electrical signal provided on the output, the control system having a second input configured to receive the second electrical signal and generate the control signal in response to the received first and second electrical signals.

22. A circuit, comprising:
a polarization beam splitter having an input and first and second outputs, the polarization beam splitter configured to receive an optical signal on the input and provide a first optical output signal on the first output and a second optical output signal on the second output;
an optical detector having an input and an output, the optical detector configured to accept a portion of the first optical signal on the input and convert the portion into an electrical signal provided on the output; and
a control system having an input and an output, the control system configured to receive the electrical signal on the input and generate a control signal provided on the output,
wherein the portion of the first optical output signal includes a portion of an amplified spontaneous emission, and the control signal from the control system is utilized to control a characteristic of the first optical output signal.

23. The circuit of claim 17, wherein the bias signal results in an electro-optic effect which controls the characteristic of the first optical output signal.

24. A circuit, comprising:
a polarization beam splitter having an input and first and second outputs, the polarization beam splitter configured to receive an optical signal on the input and provide a first optical output signal on the first output and a second optical output signal on the second output;
an optical detector having an input and an output, the optical detector configured to accept a portion of the first optical signal on the input and convert the portion into an electrical signal provided on the output;
a control system having an input and an output, the control system configured to receive the electrical signal on the input and generate a control signal provided on the output; and
a substrate, the polarization beam splitter and the optical detector being provided on the substrate,
wherein the control signal from the control system is utilized to control a characteristic of the first optical output signal.

* * * * *